May 11, 1943.  J. V. COOK  2,318,925
CONVEYER FOR BAKING OVENS
Filed May 14, 1941   2 Sheets-Sheet 2

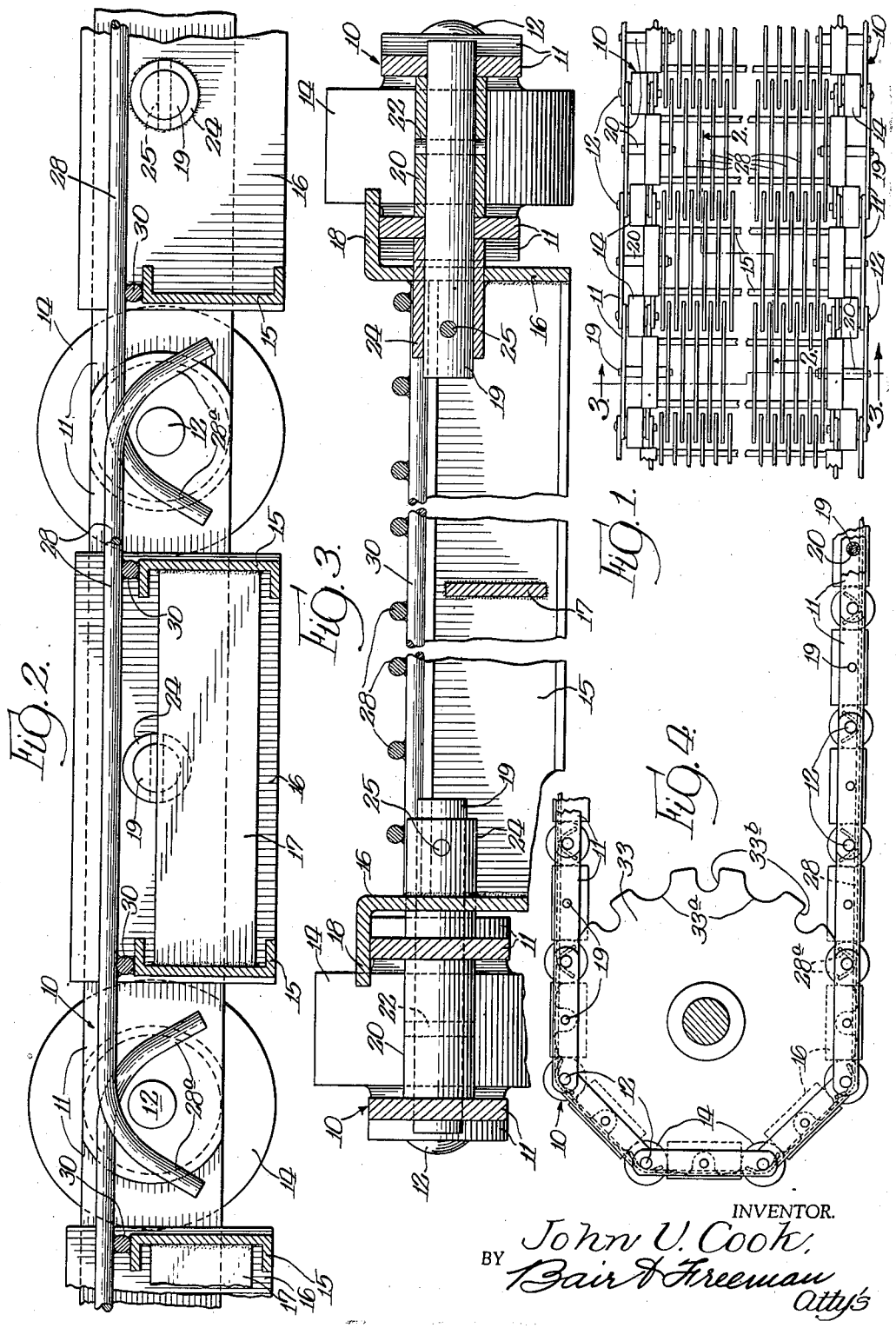

INVENTOR.
John V. Cook.
BY Bair & Freeman
Atty's.

Patented May 11, 1943

2,318,925

UNITED STATES PATENT OFFICE 2,318,925

CONVEYER FOR BAKING OVENS

John V. Cook, Chicago, Ill., assignor to The Petersen Oven Company, Chicago, Ill., a corporation of Illinois Application May 14, 1941, Serial No. 393,354

10 Claims. (Cl. 198—194)

This invention pertains to conveyers of the horizontally travelling type, including a pair of spaced apart strands of endless chain connected together by a plurality of material supporting devices. More particularly this invention relates to conveyers for use in baking ovens, wherein the material such as bread, cakes, etc., is fed on to the conveyer at one end thereof and carried through the oven and discharged from the opposite end of the conveyer in baked condition.

One of the objects of this invention is to provide a novel form of conveyer which permits obtaining an efficient baking operation and which is constructed so as to minimize the wear on parts of the conveyer, and thereby prolongs the operating life thereof.

Another object is to provide an improved conveyer of the character indicated wherein the material supporting devices are in the form of grills, which afford more uniform heat distribution within the oven so as to obtain improved baking efficiency.

A further object is to provide an improved conveyer of the character indicated, wherein the material supporting devices are in the form of grills composed of a plurality of longitudinally extending rods, with the rods of one grill structure disposed in laterally offset and interlaced relation to the rod members of the next adjacent grill device, to provide a continuous material supporting surface of grill formation.

Still another object is to provide an improved conveyer of the type having a continuous grill form material supporting surface, and characterized by the provision of a novel coupler section which permits quick and easy adjustment of the length of the conveyer by the insertion in or removal of said section from the conveyer, or by the insertion in or removal of other sections of the conveyer.

Other objects and advantages of this invention will be apparent from the following description, taken in connection with the accompanying drawings, in which—

Figure 1 is a top plan view of a fragmentary portion of the conveyer embodying the present invention.

Figure 2 is a longitudinal staggered section, taken substantially as indicated at line 2—2 on Figure 1.

Figure 3 is a staggered transverse section view, taken substantially as indicated at line 3—3 on Figure 1.

Figure 4 is a side elevational view of the conveyer shown travelling around a sprocket wheel.

Figure 5:
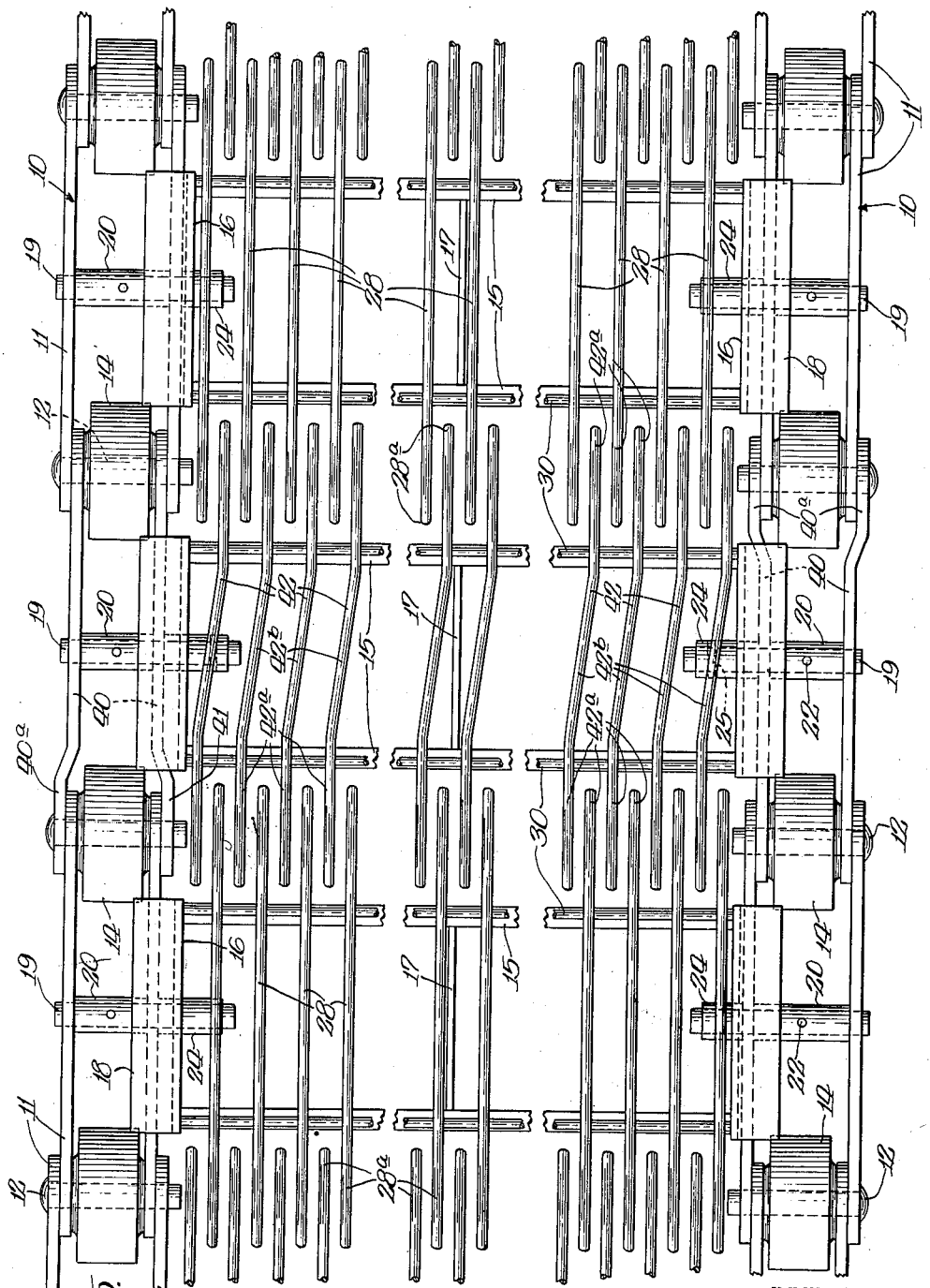
Figure 5 is a top plan view of a fragmentary portion of the conveyer showing my novel coupler section.

Heretofore conveyers used in baking ovens in the main were provided with material supporting devices in the form of trays and sometimes termed pans or aprons, and which were usually fabricated from an imperforated sheet of metal. The conveyer structure embodying the present invention in effect provides a continuous material supporting belt of grill formation which permits efficient distribution of heat within the baking chamber, so that heat is substantially uniformly brought in contact with all portions of the material being baked. Such an arrangement facilitates the control of the heat distribution within the chamber and permits obtaining greater efficiency in the baking operation.

The conveyer embodying the present invention is composed of a pair of spaced apart strands of endless chain 10, preferably as herein shown of the bar link roller type. As may be seen in Figure 1 of the drawings, the bar link chain is such that alternate pitches of the chain have the bar links connected in overlapping relation, so that straight link members, as indicated at 11, may be utilized for purposes of economy. The ends of the links are pivotally connected to pins indicated at 12, constituting the points of articulation of the chain, and mounted on the pins 12, intermediate each set of links, are rollers 14.

As seen in Figure 1 the respective strands of chain are longitudinally offset so as to align a pair of outside or outwardly offset links or pitch of one strand of chain with a pair of inside or inwardly offset links of the other strand of chain. Connected to each aligned pair of links of said chains is a material supporting device in the form of a grill. Each of said devices includes a frame structure comprising a pair of transversely extending, longitudinally spaced apart frame members 15 in the form of channels, having the flanges thereof inturned toward each other. The ends of the frame members 15 are welded to end frame members 16, the upper portion of which is bent over in a lateral outward direction to form a horizontal shelf adapted to be seated upon the adjacent innermost link of the respective aligned pitches of chain, as seen in Figure 3 of the drawings. For purposes of reinforcement the channel frame members 15 are interconnected by a longitudinally extending bar 17 at substantially the middle of the length of the channels, by means of welding, as seen in the drawings. Each of the end frames 16 of each material supporting device is fixedly secured to the adjacent link of the chain by means of a pin 19 which extends through both of the bar links of the chain, as seen in Figure 3 of the drawings, and through a sleeve 20 interposed between said links. Said pin 19 is firmly anchored with respect to the chain by means of a pin 22 extending through the sleeve 20 and the pin 19. The inner portion of the pin 19 extends through a sleeve 24 welded to the end frame, as seen in the drawings, and said sleeve is fixedly secured in position with respect to the pin 19 by a pin 25. By virtue of this construction the entire frame structure of the material supporting device is fixedly connected at opposite ends to the aligned pitches of the respective strands of chain 10 and the weight of the frame is supported by the shelf portion 18 of the end frames resting upon the adjacent bar link of the chain.

The grill structure proper of each material supporting device is composed of a plurality of longitudinally extending, transversely spaced apart rods 28. To facilitate fabrication and assembly, said rods 28 are secured in such spaced apart relation by welding thereto transversely extending rods 30 spaced apart longitudinally a proper distance, so that said rods 30 may in turn be welded to the top flange of the channel frame members 15, as seen in Figure 2 of the drawings, thus forming a complete material supporting device.

As above mentioned and as seen in the drawings, the aligned pitches of the respective chains are of opposite form, that is, the pitch of one chain has the bar links disposed in overlapping relation with respect to the adjacent links, and the other aligned pitch of chain has the bar links disposed inside of the overlapping links of the next adjacent pitches of chain. Due to this arrangement it is possible to form grill structures that are identical in size and form, as above described, so that alternate grill structures may be disposed in reversed relationship, and by virtue of which the rods 28 of one material supporting device will be disposed in central offset relation to the rods of the adjacent material supporting devices, as clearly seen in Figure 1 of the drawings.

The end portions of the rods 28 of each material supporting device extend beyond the adjacent ends of the rods of the next adjacent material supporting device, so as to obtain in effect an interlacing relationship of the rods and thereby provide a continuous material supporting surface of grill formation. The end portions of the rods of each material supporting device, commencing adjacent a vertical plane passing through the axes of articulation of the chains, are bent or curved downwardly, as indicated at 28a in the drawings. This arrangement eliminates abutment surface which might possibly be encountered by a pan containing material to be baked, and insures a smooth and easy operation in both feeding of the pans on to the conveyer as well as discharge of the pans therefrom. Such formation of the ends of the grill rods definitely eliminates possible difficulty as frequently occurs with cams and operating mechanism at the discharge end of the conveyers of this general type heretofore used, wherewith said cam and mechanism serve to control movement and position of an unloader plate adapted to be encountered by the pans as they are discharged from the conveyer.

The endless strands of chain 10 desirably are trained around sprocket wheels, as indicated at 33 in Figure 4 of the drawings, at opposite ends of the conveyer. The sprocket wheels are formed to provide pockets, as indicated at 33a, for receiving the rollers of the chain, and the marginal portion, intermediate said pockets, constitutes driving teeth, which are provided with notches, as indicated at 33b for accommodating, without obstruction, the sleeves 20 interposed between the respective bar links 11 of the chain.

Due to various conditions it may be desirable to increase or decrease the length of the conveyer chain, such as for example, to accommodate stretch of the chain. For this purpose I provide a novel form of coupler section of conveyer, as illustrated in Figure 5 of the drawings. Said coupler includes a pair of pitches of bar link chain, disposed in opposite relation to each other, with bar link 40 being normally inside links of chain and having one end outwardly offset as indicated at 40a. Otherwise the chain of the coupler is identical to a regular pitch of chain including pins, rollers, etc., and is connected to the ends of an identical frame structure of a grill form material supporting device as above described. Obviously the coupler section may be quickly and easily inserted in or removed from the other sections of the conveyer, and enable proper connection of the adjacent sections.

The grill rods 42 of the coupler section are each formed with straight-parallel, transversely offset portions 42a, connected by an intermediate portion 42b, disposed at a slight angle. The purpose of the offset relation of said end portions of the rods is to enable obtaining interlacing of said end portions with the rods of the adjacent grills of the conveyer, as seen in Figure 5. The ends of said straight portions 42a of said rods are bent or curved downwardly in the same manner as illustrated in Figure 2 for the rods 28.

Although I have herein shown and described a preferred embodiment of my invention, it is apparent that it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. A flat top conveyer comprising a pair of spaced apart strands of endless chain, and separate material supporting devices disposed in adjacent relation and connected at opposite ends to the respective chains to form a continuous material supporting surface, each device having its total material supporting surface in the form of a grill and comprising a pair of transversely extending, longitudinally spaced apart frame members connected to said chains, and a plurality of transversely spaced apart longitudinally extending rods secured intermediate their length to said frame members, the ends of said rods of each device beyond said frame members being disposed in transverse offset relation to the rods of the next adjacent device, said frame members being so dimensioned and connected to the chains to support said rods above the axes of articulation of said chains on the upper run of said conveyer.

2. A flat top conveyer comprising a pair of spaced apart strands of endless chain, and separate material supporting devices disposed in adjacent relation and connected at opposite ends to the respective chains to form a continuous material supporting surface, each device having its total material supporting surface in the form of a grill and comprising a pair of transversely extending, longitudinally spaced apart frame members connected to said chains, and a plurality of transversely spaced apart longitudinally extending rods secured intermediate their length to said frame members, the ends of said rods of each device beyond said frame members being disposed in transverse offset relation to the rods of the next adjacent device, and said rods at one end of each device extending beyond the adjacent ends of the rods of the next adjacent device, in interlaced relation thereto, said frame members being so dimensioned and connected to the chains to support said rods above the axes of articulation of said chains on the upper run of said conveyer.

3. A flat top conveyer comprising a pair of spaced apart strands of endless chain, and separate material supporting devices disposed in adjacent relation and connected at opposite ends to the respective chains to form a continuous material supporting surface, each device having its total material supporting surface in the form of a grill and comprising a pair of transversely extending, longitudinally spaced apart frame members connected to said chains, and a plurality of transversely spaced apart longitudinally extending rods secured intermediate their ends to said frame members, the ends of said rods of each device beyond said frame members being disposed in transverse offset relation to the rods of the next adjacent device, and said rods at one end of each device extending beyond and in interlacing relation to the adjacent ends of the rods of the next adjacent device, in downturned relation to the supporting surface of said rods, said frame members being so dimensioned and connected to the chains to support said rods above the axes of articulation of said chains on the upper run of said conveyer.

4. A flat top conveyer comprising a pair of spaced apart strands of endless chain, and separate material supporting devices disposed in adjacent relation and connected at opposite ends to the respective chains to form a continuous material supporting surface, each device having its total material supporting surface in the form of a grill and comprising a pair of transversely extending, longitudinally spaced apart frame members connected to said chains, and a plurality of transversely spaced apart longitudinally extending rods secured intermediate their ends to said frame members, the ends of said rods of each device beyond said frame members being disposed in transverse offset relation to the rods of the next adjacent device, and the ends of the rods of each device extending beyond the adjacent ends of the rods of the adjacent devices, in interlaced relation thereto, said frame members being so dimensioned and connected to the chains to support said rods above the axes of articulation of said chains on the upper run of said conveyer.

5. A flat top conveyer comprising a pair of spaced apart strands of endless chain, and separate material supporting devices disposed in adjacent relation and connected at opposite ends to the respective chains to form a continuous material supporting surface, each device having its total material supporting surface in the form of a grill and comprising a pair of transversely extending, longitudinally spaced apart frame members connected to said chains, and a plurality of transversely spaced apart longitudinally extending rods secured intermediate their ends to said frame members, the ends of said rods of each device beyond said frame members being disposed in transverse offset relation to the rods of the next adjacent device, and the ends of the rods of each device extending beyond and in interlacing relation to the adjacent ends of the rods of the adjacent devices in downturned relation to the supporting surface of said rods, said frame members being so dimensioned and connected to the chains to support said rods above the axes of articulation of said chains on the upper run of said conveyer.

6. A conveyer comprising a pair of spaced apart strands of endless chain, and material supporting devices connected at opposite ends to the respective chains to form a continuous material supporting surface, each device being in the form of a grill and comprising a pair of transversely extending, longitudinally spaced apart frame members connected to said chains, and a plurality of transversely spaced apart longitudinally extending rods secured to said frame members, the rods of each device being disposed in transverse offset relation to the rods of the next adjacent device, and the ends of the rods of each device extending beyond and in interlacing relation to the adjacent ends of the rods of the adjacent devices, said extending end portions of the rods being bent, commencing adjacent a vertical plane through the axes of articulation of the chains, in a downwardly direction with respect to the supporting surface of said rods.

7. A conveyer comprising a pair of spaced apart strands of endless bar link chain, and material supporting devices connected to said chains to provide a continuous material supporting surface, said devices being of identical size and form and each being in the form of a grill including a plurality of transversely spaced apart longitudinally extending rods, said chains being disposed in longitudinal offset relation to align opposite sets of bar links, whereby said identical devices may be connected in alternately reversed relation to dispose the rods of one device in lateral offset relation to the rods of the next adjacent device.

8. A flat top conveyer comprising a pair of spaced apart strands of endless bar link chain, and material supporting devices connected at opposite ends to the respective chains to form a continuous material supporting surface, each device having its total material supporting surface in the form of a grill and comprising a pair of transversely extending longitudinally spaced apart main frame members, end frame members connected to the main frame members and each having a laterally extending shelf portion seated upon the upper edge of the adjacent bar link of said chains, and a plurality of transversely spaced apart longitudinally extending rods secured to said main frame members to form a continuous grill surface for the upper run of the conveyer.

9. A flat top conveyer comprising a pair of spaced apart strands of endless bar link chain, and material supporting devices connected at opposite ends to the respective chains to form a continuous material supporting surface, each device having its total material supporting surface in the form of a grill and comprising a pair of transversely extending longitudinally spaced apart main frame members, end frame members connected to the main frame members and each having a laterally extending shelf portion seated upon the upper edge of the adjacent bar link of said chains, means connecting the respective end frame to the adjacent bar link of said chains, and a plurality of transversely spaced apart longitudinally extending rods secured to said main frame members to form a continuous grill surface for the upper run of the conveyer.

10. A coupler section of conveyer for a conveyer comprising a pair of spaced apart strands of endless chain, and separate material supporting devices disposed in adjacent relation and connected at opposite ends to the respective chains to form a continuous material supporting surface, each device having its total material supporting surface in the form of a grill and comprising a pair of transversely extending longitudinally spaced apart frame members connected to said chains, together with a plurality of transversely spaced apart longitudinally extending rods secured intermediate their length to said frame members, said coupler section comprising two spaced apart, oppositely disposed pitches of bar link chain, one end of each pitch of chain having the bar links outwardly offset, and a material supporting device connected at opposite ends to said bar links of chain, said device including frame members connecting said links of chain, and a plurality of longitudinally extending transversely spaced apart rods, the end portions of each rod being disposed in parallel offset relation to each other, whereby said rods will be disposed in offset relation to rods of adjacent material supporting devices, when said coupler section is in place.

JOHN V. COOK.